(12) United States Patent
Mellet et al.

(10) Patent No.: US 8,894,534 B2
(45) Date of Patent: Nov. 25, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/750,668

(22) Filed: Jan. 25, 2013

(65) Prior Publication Data

US 2013/0203552 A1 Aug. 8, 2013

Related U.S. Application Data

(60) Provisional application No. 61/594,610, filed on Feb. 3, 2012.

(51) Int. Cl.
*F16H 3/62* (2006.01)
*F16H 3/44* (2006.01)
*F16H 3/66* (2006.01)

(52) U.S. Cl.
CPC ............ *F16H 3/44* (2013.01); *F16H 2200/201* (2013.01); *F16H 2200/0065* (2013.01); *F16H 3/666* (2013.01); *F16H 2200/2046* (2013.01); *F16H 2200/2025* (2013.01)
USPC .......................... 475/275; 475/276; 475/278

(58) Field of Classification Search
None
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,037,232 B2 * | 5/2006 | Ishimaru | 475/275 |
| 7,267,630 B2 * | 9/2007 | Tabata et al. | 475/275 |

FOREIGN PATENT DOCUMENTS

JP 2005016704 A 1/2005

* cited by examiner

*Primary Examiner* — Erin D Bishop

(57) ABSTRACT

A transmission is provided having an input member, an output member, two planetary gear sets, a planetary gear set assembly, a plurality of coupling members and a plurality of torque transmitting devices. Each of the planetary gear sets includes first, second and third members and the planetary gear set assembly includes a first, second, third and fourth member. The torque transmitting devices include clutches and brakes actuatable in combinations of two to establish a plurality of forward gear ratios and one reverse gear ratio.

15 Claims, 2 Drawing Sheets

| GEAR STATE | GEAR RATIO | RATIO STEP | TORQUE TRANSMITTING ELEMENTS | | | | | |
|---|---|---|---|---|---|---|---|---|
| | | | 24 | 32 | 28 | 26 | 30 | 34 |
| REV | -3.250 | | | | X | | X | |
| N | | -0.76 | | | | | O | |
| 1ST | 4.274 | | X | | | | X | |
| 2ND | 2.508 | 1.70 | X | X | | | | |
| 3RD | 1.933 | 1.30 | X | | | | | X |
| 4TH | 1.625 | 1.19 | X | | X | | | |
| 5TH | 1.171 | 1.39 | X | | | X | | |
| 6TH | 1.058 | 1.11 | | | X | | | X |
| 7TH | 0.884 | 1.20 | | | | X | | X |
| 8TH | 0.839 | 1.05 | | | X | X | | |
| 9TH | 0.667 | 1.26 | | X | | X | | |

X = ON - ENGAGED CARRYING TORQUE
O = ON - ENGAGED NOT CARRYING TORQUE

MULTI-SPEED TRANSMISSION

CROSS-REFERENCE TO RELATED APPLICATIONS

This application claims the benefit of U.S. Provisional Application No. 61/594,610 filed Feb. 3, 2012. The disclosure of the above application is incorporated herein by reference.

FIELD

The invention relates generally to a multiple speed transmission having a plurality of planetary gear sets and a plurality of torque transmitting devices and more particularly to a transmission having nine or more speeds, two planetary gear sets, a planetary gear set assembly and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, two planetary gear sets, a planetary gear set assembly, a plurality of coupling members and a plurality of torque transmitting devices. Each of the planetary gear sets includes first, second and third members and the planetary gear set assembly includes a first, second, third and fourth member. The torque transmitting devices are for example clutches and brakes.

In accordance with an aspect of the invention, the transmission has a planetary gear set assembly having a first sun gear, a second sun gear, a carrier member and a ring member.

In accordance with yet another aspect of the invention, the transmission has a first planetary gear set having a sun gear, a carrier member and a ring gear member, wherein the sun gear of the first planetary gear set is rotationally fixed to a stationary member.

In accordance with yet another aspect of the invention, the transmission has a second planetary gear set having a sun gear, a carrier member and a ring gear member.

In accordance with yet another aspect of the invention, the transmission has a first interconnecting member continuously interconnecting the carrier member of the planetary gear set assembly with the ring gear of the second planetary gear set.

In accordance with yet another aspect of the invention, the transmission has a second interconnecting member continuously interconnecting the second sun gear of the planetary gear set assembly with the carrier member of the second planetary gear set.

In accordance with still another aspect of the invention, the transmission has a first torque transmitting mechanism that is selectively engageable to interconnect the first sun gear of the planetary gear set assembly with the carrier member of the first planetary gear set.

In accordance with still another aspect of the invention, the transmission has a second torque transmitting mechanism that is selectively engageable to interconnect the ring gear of the second planetary gear set and the carrier member of the planetary gear set assembly with the ring gear of the first planetary gear set and the input member.

In accordance with still another aspect of the invention, the transmission has a third torque transmitting mechanism that is selectively engageable to interconnect the carrier member of the second planetary gear set and the second sun gear of the planetary gear set assembly with the carrier member of the second planetary gear set.

In accordance with still another aspect of the invention, the transmission has a fourth torque transmitting mechanism that is selectively engageable to interconnect the ring gear of the second planetary gear set and the carrier member of the planetary gear set assembly with the stationary member.

In accordance with yet another aspect of the invention, the transmission has a fifth torque transmitting mechanism that is selectively engageable to interconnect the carrier member of the second planetary gear set and the second sun gear of the planetary gear set assembly with the stationary member.

In accordance with yet another aspect of the invention, the transmission has a sixth torque transmitting mechanism that is selectively engageable to interconnect the sun gear of the second planetary gear set with the stationary member.

In accordance with yet another aspect of the invention, the torque transmitting mechanisms are selectively engageable in combinations of at least two to establish at least nine forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1, 2 and 3.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a second component or element of a first planetary gear set is permanently coupled to a second component or element of the second planetary gear set. A third component or element of the first planetary gear set is permanently coupled a third component or element of the second planetary gear set and to a third component or element of the fourth planetary gear set. A first component or element of the second planetary gear set is permanently coupled to a second component or element of the fourth planetary gear set.

Figure 1:
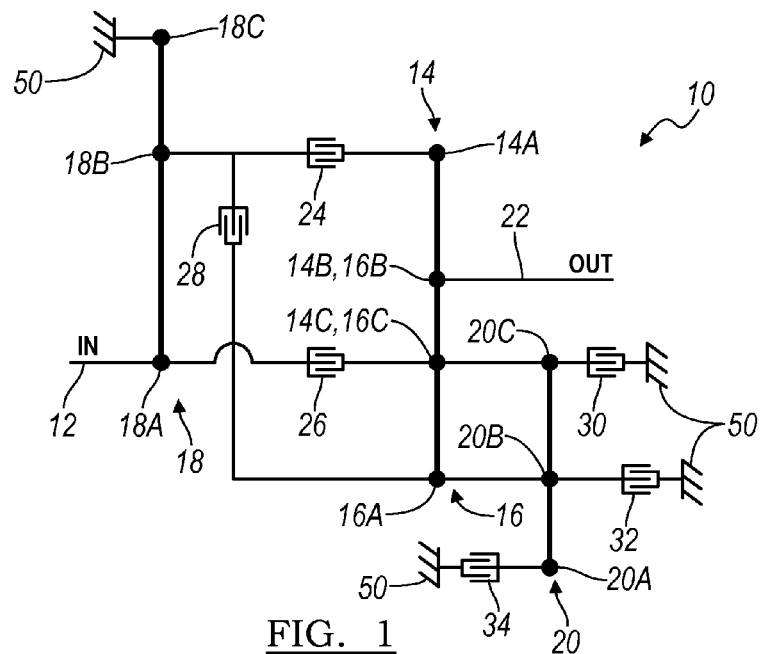
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the levers for the first planetary gear set 14 and the second planetary gear set 16 have been combined into a single four node lever having: a first node 14A, a second node 14B, 16B, a third node 14C, 16C and a fourth node 16A. Thus, the second member 14B of the first planetary gear set 14 is coupled directly to the second member 16B of the second planetary gear set 16 and the third member 14C of the first planetary gear set 14 is coupled directly to the third member 16C of the second planetary gear set 16. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 18A of the third planetary gear set 18. The output member 22 is coupled to the second node 14B, 16B of the combined levers of the first and second planetary gear sets 14, 16. The fourth node 16A of the combined levers of the first and second planetary gear sets 14, 16 is coupled to the second node 20B of the fourth planetary gear set 20. The third node 14C, 16C of the combined levers of the first and second planetary gear sets 14, 16 is coupled to the third node 20C of the fourth planetary gear set 20. The third node 18C of the third planetary gear set 18 is permanently coupled directly to the stationary member or transmission housing 50.

A first clutch 24 selectively connects the first node 14A of the combined levers of the first and second planetary gear sets 14, 16 with the second node 18B of the third planetary gear set 18. A second clutch 26 selectively connects the input member or shaft 12 and the first node 18A of the third planetary gear set 18 with the third node 20C of the fourth planetary gear set 20 and the third node 14C, 16C of the combined levers of the first and second planetary gear sets 14, 16. A third clutch 28 selectively connects the second node 18B of the third planetary gear set 18 with the second node 20B of the fourth planetary gear set 20 and the fourth node 16A of the combined levers of the first and second planetary gear sets 14, 16. A first brake 30 selectively connects the third node 20C of the fourth planetary gear set 20 and the third node 14C, 16C of the combined levers of the first and second planetary gear sets 14, 16 with a stationary member or transmission housing 50. A second brake 32 selectively connects the second node 20B of the fourth planetary gear set 20 and the fourth node 16A of the combined levers of the first and second planetary gear sets 14, 16 with the stationary member or transmission housing 50. A third brake 34 selectively connects the first node 20A of the fourth planetary gear set 20 with the stationary member or transmission housing 50.

Figure 2:
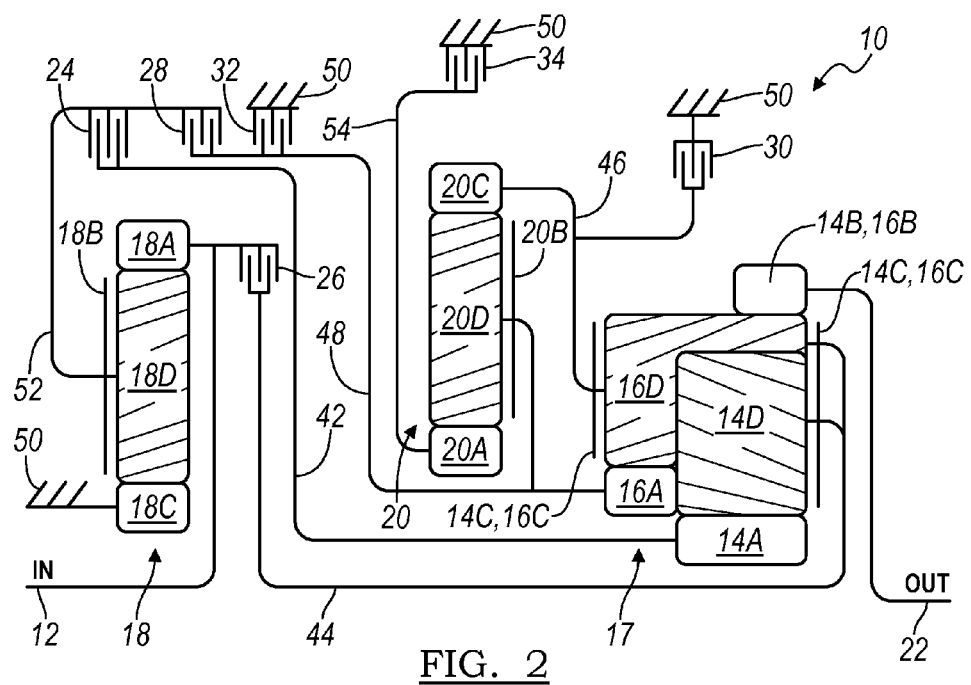
FIG. 2 is a diagrammatic illustration of an embodiment of a nine speed transmission according to the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 and the planetary gear set 16 are combined to form a planetary gear set assembly 17. Planetary gear set assembly 17 includes a first sun gear member 14A, a second sun gear member 16A, a ring gear member 14B, 16B and a planet gear carrier member 14C, 16C that rotatably supports a first set of planet gears 14D (only one of which is shown) and a second set of pinion gears 16D. The first sun gear member 14A is connected for common rotation with a first shaft or interconnecting member 42. The ring gear member 14B, 16B is connected for common rotation with the output shaft or member 22. The planet carrier member 14C, 16C is connected for common rotation with a second shaft or interconnecting member 44 and a third shaft or interconnecting member 46. The first set of planet gears 14D are each configured to intermesh with both the sun gear member 14A and the second set of planet gears 16D. The second set of planet gears 16D are each configured to intermesh with both the sun gear member 16A, ring gear member 14B, 16B and the first set of planet gears 14D. The second sun gear member 16A is connected for common rotation with a fourth shaft or interconnecting member 48.

The planetary gear set 18 includes a sun gear member 18C, a ring gear member 18A and a planet gear carrier member 18B that rotatably supports a set of planet gears 18D (only one of which is shown). The sun gear member 18C is connected directly to the transmission housing 50 to prevent sun gear member 18C from rotating relative to the transmission housing. The ring gear member 18A is connected for common rotation with the input shaft or member 12. The planet carrier member 18B is connected for common rotation with a fifth shaft or interconnecting member 52. The planet gears 18D are each configured to intermesh with both the sun gear member 18C and the ring gear member 18A.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with a sixth shaft or interconnecting member 54. The ring gear member 20C is connected for common rotation with the third shaft or interconnecting member 46. The planet carrier member 20B is connected for common rotation with the fourth shaft or interconnecting member 48. The planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 24, 26, 28 and brakes 30, 32 and 34 allow for selective interconnection of the shafts or interconnecting members, members of the planetary gear sets and the housing. For example, the first clutch 24 is selectively engageable to connect the first shaft or interconnecting member 42 with the sixth shaft or interconnecting member 52. The second clutch 26 is selectively engageable to connect the input shaft or member 12 with the second shaft or interconnecting member 44. The third clutch 28 is selectively engageable to connect the fifth shaft or interconnecting member 52 with the fourth shaft or interconnecting member 48. The first brake 30 is selectively engageable to connect the third shaft or interconnecting member 46 with the stationary element or the transmission housing 50 in order to restrict the member 46 from rotating relative to the transmission housing 50. The second brake 32 is selectively engageable to connect the fourth shaft or interconnecting member 48 with the stationary element or the transmission housing 50 in order to restrict the member 48 from rotating relative to the transmission housing 50. The third brake 34 is selectively engageable to connect the sixth shaft or interconnecting member 54 with the stationary element or the transmission housing 50 in order to restrict the member 54 from rotating relative to the transmission housing 50.

Referring now to FIG. 2 and FIG. 3, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 30, second brake 32 and third brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, third clutch 28 and first brake 30 are engaged or activated. The third clutch 28 connects the fifth shaft or interconnecting member 52 with the fourth shaft or interconnecting member 48. The first brake 30 connects the third shaft or interconnecting member 46 with the stationary element or the transmission housing 50 in order to restrict the member 46 from rotating relative to the transmission housing 50. Likewise, the nine forward ratios are achieved through different combinations of clutch and brake engagement, as shown in FIG. 3.

It will be appreciated that the foregoing explanation of operation and gear states of the nine speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. For example, the various shaft or interconnecting members described above may be combined to form a fewer number of shafts or divided into separate shafts, increasing the total number of shafts. Such variations are not to be regarded as a departure from the spirit and scope of the invention.

The invention claimed is:

1. A transmission comprising:
    an input member;
    an output member;
    a planetary gear set assembly having a first member, a second member, a third member and a fourth member, wherein the second member of the planetary gear set assembly is directly and continuously interconnected with the output member;
    a first planetary gear set having a first, a second and a third member, and wherein the third member of the first planetary gear set is rotationally fixed to a stationary member, wherein the first member of the first planetary gear set is directly and continuously interconnected with the input member;
    a second planetary gear set having a first, a second and a third member;
    a first interconnecting member continuously interconnecting the third member of the planetary gear set assembly with the third member of the second planetary gear set;
    a second interconnecting member continuously and directly interconnecting the fourth member of the planetary gear set assembly with the second member of the second planetary gear set; and
    at least six torque transmitting mechanisms each selectively engageable to interconnect at least one of the first, second, third and fourth members of the planetary gear set assembly or at least one of the first, second and third members of the first and second planetary gear sets with another of the first, second, third and fourth members of the planetary gear set assembly, another of the first, second and third members of the first and second planetary gear sets or the stationary member, and
    wherein the at least six torque transmitting mechanisms are selectively engageable in combinations of at least two to establish a plurality forward speed ratios and at least one reverse speed ratio between the input member and the output member, and the first member of the first planetary gear set is a ring gear.

2. The transmission of claim 1 wherein a first of the at least six torque transmitting mechanisms is selectively engageable to interconnect the first member of the planetary gear set assembly with the second member of the first planetary gear set.

3. The transmission of claim 2 wherein a second of the at least six torque transmitting mechanisms is selectively engageable to interconnect the third member of the second planetary gear set and the third member of the planetary gear set assembly with the first member of the first planetary gear set and the input member.

4. The transmission of claim 3 wherein a third of the at least six torque transmitting mechanisms is selectively engageable to interconnect the second member of the second planetary gear set and the fourth member of the planetary gear set assembly with the second member of the first planetary gear set.

5. The transmission of claim 4 wherein a fourth of the at least six torque transmitting mechanisms is selectively engageable to interconnect the third member of the second planetary gear set and the third member of the planetary gear set assembly with the stationary member.

6. The transmission of claim 5 wherein a fifth of the at least six torque transmitting mechanisms is selectively engageable to interconnect the second member of the second planetary gear set and the fourth member of the planetary gear set assembly with the stationary member.

7. The transmission of claim 6 wherein a sixth of the at least six torque transmitting mechanisms is selectively engageable to interconnect the first member of the second planetary gear set with the stationary member.

8. The transmission of claim 1 wherein three of the at least six torque transmitting mechanisms are brakes, each of the brakes selectively connect at least one of the members of the first and second planetary gear sets or the planetary gear set assembly to the stationary member, three of the at least six torque transmitting mechanisms are clutches, and each of the clutches selectively connect at least one of the members of the first and second planetary gear sets or the planetary gear set assembly to at least one other member of the first and second planetary gear sets or the planetary gear set assembly.

9. The transmission of claim 1 wherein the first and the fourth members of the planetary gear set assembly are a first and a second sun gear, respectively, and the third member of the first planetary gear set and the first member of the second planetary gear sets are sun gears, the second members of the first and second planetary gear sets and the third member of the planetary gear set assembly are carrier members, and the second member of the planetary gear set assembly and the first member of the first planetary gear set and the third member the second planetary gear set are ring gears.

10. The transmission of claim 9 wherein the carrier member of the planetary gear set assembly rotatably supports a first plurality of planet gears and a second plurality of planet gears, wherein the first plurality of planet gears intermesh with the second plurality of planet gears and with the first sun gear of the planetary gear set assembly, and wherein the second plurality of planet gears intermesh with the first plurality of planet gears, the second sun gear and the ring gear of the planetary gear set assembly.

11. A transmission comprising:
an input member;
an output member;
a planetary gear set assembly having a first member, a second member, a third member and a fourth member;
a first planetary gear set having a first, a second and a third member wherein the third member of the first planetary gear set is rotationally fixed to a stationary member;
a second planetary gear set having a first, a second and a third member;
a first interconnecting member continuously interconnecting the third member of the planetary gear set assembly with the third member of the second planetary gear set;
a second interconnecting member continuously interconnecting the fourth member of the planetary gear set assembly with the second member of the second planetary gear set;
a first torque transmitting mechanism selectively engageable to interconnect the first member of the planetary gear set assembly with the second member of the first planetary gear set;
a second torque transmitting mechanism selectively engageable to directly interconnect the third member of the second planetary gear set and the third member of the planetary gear set assembly with the first member of the first planetary gear set and the input member;
a third torque transmitting mechanism selectively engageable to interconnect the second member of the second planetary gear set and the fourth member of the planetary gear set assembly with the second member of the first planetary gear set;
a fourth torque transmitting mechanism selectively engageable to interconnect the third member of the second planetary gear set and the third member of the planetary gear set assembly with the stationary member;
a fifth torque transmitting mechanism selectively engageable to interconnect the second member of the second planetary gear set and the fourth member of the planetary gear set assembly with the stationary member; and
a sixth torque transmitting mechanism selectively engageable to interconnect the first member of the second planetary gear set with the stationary member, and
wherein the torque transmitting mechanisms are selectively engageable in combinations of at least two to establish at least nine forward speed ratios and at least one reverse speed ratio between the input member and the output member.

12. The transmission of claim 11 wherein the first and the fourth members of the planetary gear set assembly are a first and a second sun gear, respectively, and the third member of the first planetary gear set and the first member of the second planetary gear sets are sun gears, the second members of the first and second planetary gear sets and the third member of the planetary gear set assembly are carrier members, and the second member of the planetary gear set assembly and the first member of the first planetary gear set and the third member the second planetary gear set are ring gears.

13. The transmission of claim 12 wherein the carrier member of the planetary gear set assembly rotatably supports a first plurality of planet gears and a second plurality of planet gears, wherein the first plurality of planet gears intermesh with the second plurality of planet gears and with the first sun gear of the planetary gear set assembly, and wherein the second plurality of planet gears intermesh with the first plurality of planet gears, the second sun gear and the ring gear of the planetary gear set assembly.

14. A transmission comprising:
an input member;
an output member;
a planetary gear set assembly having a first sun gear, a second sun gear, a carrier member and a ring gear;
a first planetary gear set having a sun gear, a carrier member and a ring gear, wherein the sun gear of the first planetary gear set is rotationally fixed to a stationary member;
a second planetary gear set having a sun gear, a carrier member and a ring gear;
a first interconnecting member continuously interconnecting the carrier member of the planetary gear set assembly with the ring gear of the second planetary gear set;

a second interconnecting member continuously interconnecting the second sun gear of the planetary gear set assembly with the carrier member of the second planetary gear set;

a first torque transmitting mechanism selectively engageable to interconnect the first sun gear of the planetary gear set assembly with the carrier member of the first planetary gear set;

a second torque transmitting mechanism selectively engageable to interconnect the ring gear of the second planetary gear set and the carrier member of the planetary gear set assembly with the ring gear of the first planetary gear set and the input member;

a third torque transmitting mechanism selectively engageable to interconnect the carrier member of the second planetary gear set and the second sun gear of the planetary gear set assembly with the carrier member of the first planetary gear set;

a fourth torque transmitting mechanism selectively engageable to interconnect the ring gear of the second planetary gear set and the carrier member of the planetary gear set assembly with the stationary member;

a fifth torque transmitting mechanism selectively engageable to interconnect the carrier member of the second planetary gear set and the second sun gear of the planetary gear set assembly with the stationary member; and a sixth torque transmitting mechanism selectively engageable to interconnect the sun gear of the second planetary gear set with the stationary member, and wherein the torque transmitting mechanisms are selectively engageable in combinations of at least two to establish at least nine forward speed ratios and at least one reverse speed ratio between the input member and the output member.

15. The transmission of claim 14 wherein the carrier member of the planetary gear set assembly rotatably supports a first plurality of planet gears and a second plurality of planet gears, wherein the first plurality of planet gears intermesh with the second plurality of planet gears and with the first sun gear of the planetary gear set assembly, and wherein the second plurality of planet gears intermesh with the first plurality of planet gears, the second sun gear and the ring gear of the planetary gear set assembly.

* * * * *